3,524,941

TELEPHONE EXCHANGE SYSTEM WITH FACILITY FOR SHORT IDENTIFICATION CODE DIALING

André Friese, Gauting, near Munich, and Artur Nagel, Germering, near Munich, Germany, assignors to Siemens Aktiengesellschaft, Berlin and Munich, Germany Filed Dec. 27, 1966, Ser. No. 604,761
Claims priority, application Germany, Dec. 29, 1965, S 101,238
Int. Cl. H04m 3/44
U.S. Cl. 179—18 9 Claims

ABSTRACT OF THE DISCLOSURE

An improved telephone installation with extension subscriber stations and including a central control system for completing connections to called subscribers in response to a dialed short identification code in accordance with the group characteristic identification of the calling subscriber. Identification and conversion means establish a code identification of the calling subscriber and under the control of a common control system in response to receipt of a dialed short identification code representing a called subscriber, effect conversion of the short identification code in accordance with the identification code of the calling subscriber for marking and completion of the connection to the called subscriber.

CROSS-REFERENCE TO RELATED APPLICATION

Applicants claim priority from corresponding German application S 101,238, filed Dec. 29, 1965.

BACKGROUND OF THE INVENTION

Field of the invention

This invention relates to a centrally controlled telephone installation and, more particularly, to a telephone installation having a central control system providing for connections between extension stations of the installation in response to short identification codes.

Description of the prior art

The prior art teaches telephone installations having a central control system and providing for connections between extension stations in response to short identification codes.

In one such prior art system there is provided a special register which is actuated in response to the receipt if a call from a subscriber station and which serves to identify the particular calling subscriber station. The identification may suitably be provided in a code related to that calling station. This special register also provides information for performing the marking function in completing a connection path from the calling subscriber station to an appropriate, free connection set. Such a connection set may comprise a line circuit of the installation or other suitable apparatus. The special register is seized or engaged in this connection with the calling subscriber station for the duration of the call connection.

First and second register dial selectors are assigned to the special register. The calling subscriber, when desiring to make a direct call in accordance with the short identification code, actuates a special direct-call push button at his subscriber station. Typically, when the receiver is initially raised at the subscriber station set, an identification code identifying the calling subscriber is transmitted to and received in the first register dial selector. After actuating the special direct-call push button, the calling subscriber dials or otherwise transmits a special dial signal comprising the short identification code for demanding a connection to a desired, called subscriber extension station of the installation. This special dial signal is registered in the second special register dial selector. The identification codes of both the calling and called subscribers, as thus established and maintained in the first and second register dial selectors, respectively, are employed for performing the marking function in establishing a call connection path between the calling and the called subscriber stations.

In accordance with this known prior art arrangement, there is therefore required a special register to which two register dial selectors are assigned, all of which are seized for the duration of the call connection. There must additionally be provided switching means in the special register to distinguish between ordinary and special dial signals, the latter corresponding to the direct-call request. When the special register recognizes the direct-call request, the switching means establishes a special connection circuit over which the direct-call or special dial signal is transmitted to the second register dial selector. In addition, a special marking system must be provided for identifying the called subscriber station in accordance with the identification code of the calling subscriber station, registered in the first register dial selector.

Prior art telephone installations of the type set forth above are undesirably complex and employ an undesirably large number of expensive components. Further, the equipment required for performing the necessary switching functions introduces additional complexities in the installation and additional expense.

BRIEF DESCRIPTION OF THE INVENTION

These and other objections and disadvantages of prior art telephone installations which provide for establishing call connections between extension stations in accordance with special or short identification codes are overcome by the telephone installation of the invention. The installation of the invention permits a substantial reduction in the number of components required for performing this function with a resultant reduction in the complexity and cost of the installation. Further, the installation of the invention eliminates the necessity for providing special response circuits and switching circuits for operation in the direct-call mode in response to short identification codes.

In accordance with the invention, there is provided a central control system which identifies the calling subscriber station, suitably by recognition of the group characteristic of that station. A short identification code, of one or more digit positions, is transmitted by the calling station to demand a connection to a desired, called subscriber extension station. The central control system converts the short identification code in accordance with the group characteristic of the calling subscriber station to produce a corresponding conventional identification code which identifies the called subscriber extension station and is suitable for marking purposes to establish the demanded call connection. The system of the invention does not require the provision of special signalling or switching apparatus to operate in the direct-call mode, as in prior art systems.

The central control system includes a common control system, which is operative, with associated systems, in response to either conventional length or short dial codes, to present an appropriate dial identification code to an associated marking means for establishing a demanded call connection. Code evaluation means associated with and controlled by the common control system is operative to determine the receipt of a complete short identification code and to produce a demand to the common control system for converting the short code length to a conventional code for presentation to the marker. The common control system effects a renewed identification of the calling subscriber station and produces in response thereto the corresponding group characteristic identification. Code conversion means controlled by the common control system and responsive to both the group characteristic identification and the short identification code produces a conventional length identification code to which the central marker responds for completing the call connection. The marking function is therefore substantially the same for direct-call requests as for conventional length dial code requests.

The telephone installation of the invention requires only a few relatively inexpensive and simple switching means for performing the code conversion in response to a group characteristic identification, derived from the renewed identification of the calling subscriber station, and to the short identification code demanding the call connection to a given subscriber extension station. The marking function is performed by a marker which is required in a conventional system in any event, and which therefore does not represent any additional expenditure for performing operations in a direct-call mode of operation of the system of the invention. The telephone installation of the invention readily permits changing the short identification code to be dialed by a given calling subscriber for demanding a connection to a given extension station, and also changing the subscriber station which is called by a given calling station in response to a given short identification code. The group characteristic identification of extension stations associated with the installation may also be readily changed. The changes may be made by the simple expedient of altering plug board connections related to the stations or code identification groups to be changed, and do not require any changes in the control operations or connections of the central systems of the installation.

DETAILED DESCRIPTION OF THE INVENTION

Figure 1:
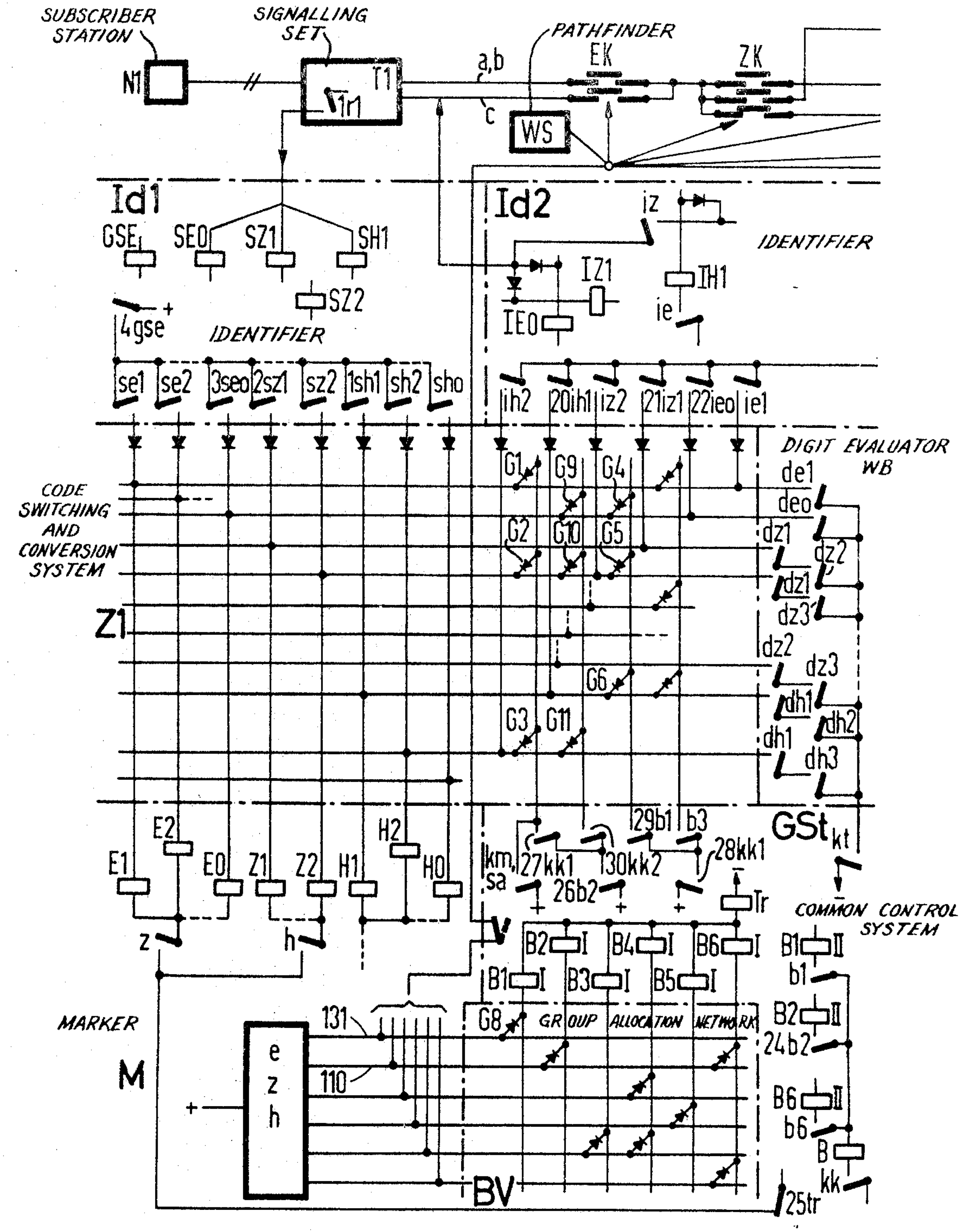
FIGS. 1 and 2 comprise composite portions of a schematic illustration of the telephone installation of the invention, sufficient for a complete understanding thereof.
Figure 2:
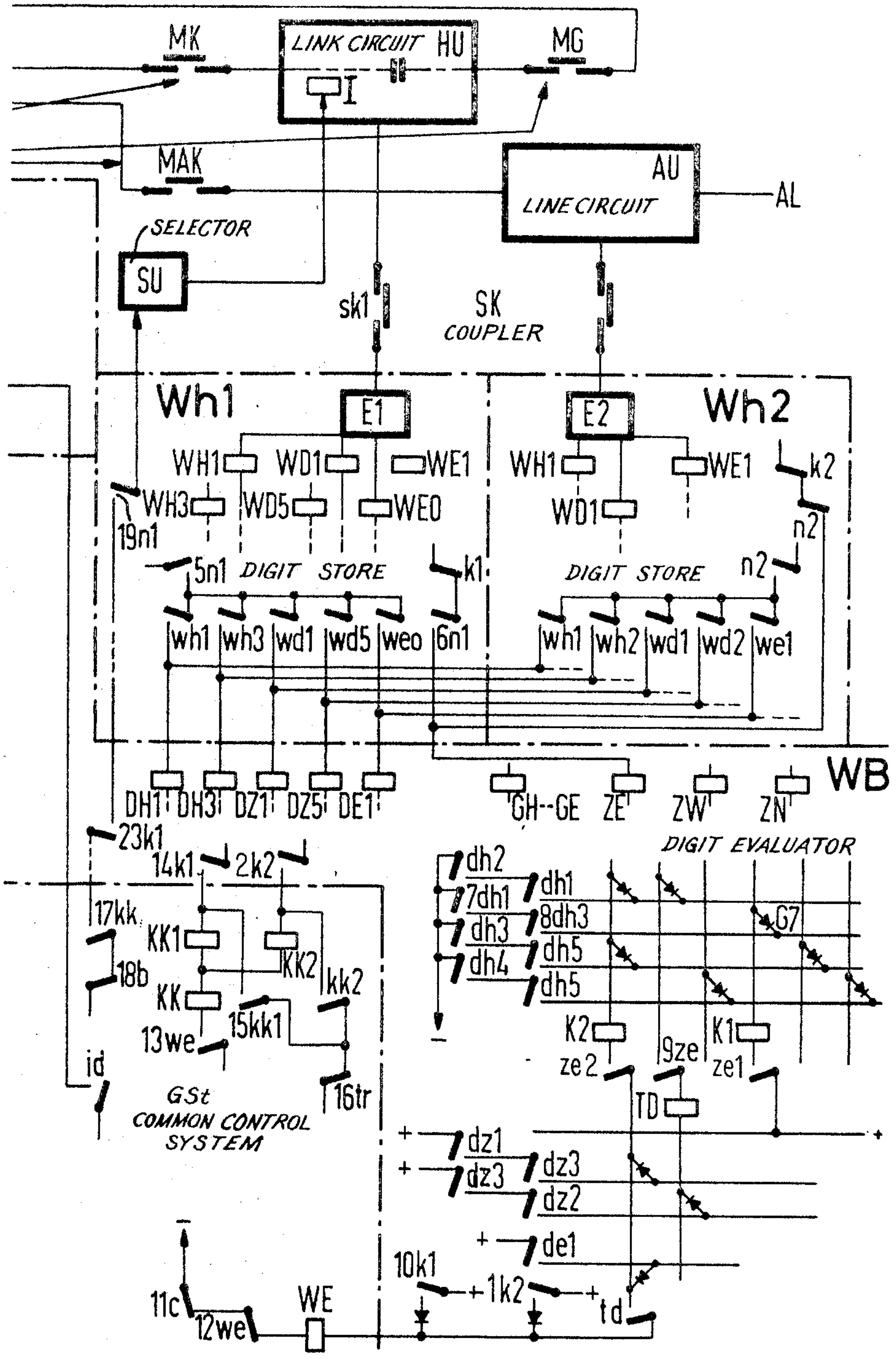

In FIG. 1 there is shown a subscriber station N1, which represents one of a plurality of such subscriber stations associated with a telephone installation in accordance with the invention. The subscriber station N1 is connected, as indicated by a broken line, with a signalling set T1 associated with the central system of the telephone installation. A suitable subscriber relay, not shown in the drawings, is provided which, upon raising of the receiver at the subscriber set of the station N1, causes actuation of its corresponding contact 1*r*1 to close and complete a circuit to the central system of the installation. The central system includes an identification system I*d*1 including a plurality of relays which identify a given calling subscriber station. The identification is effected conveniently and typically in accordance with a given identification code assigned to each such station. The code, for example, may comprise a three decimal position code representing units, tens, and hundreds. Ten identification relays are then provided for each of the positions of the code.

In the present example, subscriber station N1 is identified by the code 110. The corresponding code identifying relays for responding to the code 110 are indicated in the identification system I*d*1 and comprise, for the decimal positions of hundreds, tens, and units, the relays SH1, SZ1, and SE0, respectively. The relay SZ2 would respond to the digit 2 in the tens digit position, and represents that a plurality of relays are provided for each digit position, as mentioned above, but which are not shown for the purpose of simplifying the drawing. As schematically illustrated, the closure of contact 1*r*1 in response to the actuation of the calling relay, effects energization of the code identifying relays SE0, SZ1, and SH1 responsive to code 110 assigned to the calling subscriber station N1, whereby identification of the calling subscriber station N1 is achieved. The identification system I*d*1 is capable of responding to and identifying only a single calling subscriber station at any given time. Relay GSE may represent a suitable connection response relay which is energized to confirm a connection of system T1 to the identification system I*d*1, and effects closure of its contact 4*gse* to supply a signalling level potential to the bank of contacts *se*1 . . . *sh*0.

Each of the code identifying relays, such as relays SE0, SZ1, and SH1 has associated therewith a corresponding contact, such as the contacts 3*se*0 2*sz*1, and 1*sh*1, respectively, of the bank of contacts *se*1 . . . *sh*0. These contacts are actuated in response to energization of the corresponding relays and complete a circuit through the contact 4*gse* to a positive power supply terminal, as indicated, for developing a three decimal position code signal representative of and identifying the calling subscriber station. The number of positions of the identification code is not limited to, nor required to be three but may be of any desired number and may be in any desired code with appropriate modifications of the system.

For the assigned identification code 110 of the station N1, the contacts 1*sh*1, 2*sz*1, and 3*se*0 are closed by their corresponding, energized relays SH1, SZ1, and SE0, and produce code identification signals on their corresponding output terminals.

The code switching and conversion system Z1 is of a matrix configuration and includes a plurality of vertical lines and a plurality of horizontal lines selectively connected to the vertical lines, the function of which is described hereafter. The output terminals of the identification system I*d*1 are connected through diodes to corresponding vertical lines or leads of the code switching and conversion system Z1.

The central system further includes a marker M which is operative in response to a conventional dial identification code to perform the marking function required in completing a call connection from a calling subscriber station to a called subscriber station. The marker M includes a plurality of identification signal relays E1 . . . E0, Z1, Z2 . . . , H1, H2 . . . H0, corresponding to the units, tens, and hundreds decimal positions of a decimal identification code, in the identical manner to that of the code identifying relays of the identification system I*d*1. The code identification indication signals established by the contacts 1*sh*1, 2*sz*1, and 3*se*0 effect energization of the corresponding identification signal relays H1, Z1, and E0, thereby again representing the identification code 110 of the subscriber station N1. Holding circuits (not shown) for the identification signal relays of marker M are provided, in a well-known manner.

In marker M, the unit labelled *e, z,* and *h* represents the corresponding contacts of the identification signal relays thereof. Energization of the signal relays of the marker M effects a resultant closure of the contacts thereof and the production of appropriate output signals on the output lines associated with the unit *ezh*. The central system further includes a group allocation network BV which, as shown in FIG. 1, includes a plurality of horizontal lines connected to corresponding ones of the outputs of the unit *ezh* and respectively connected through diodes to a plurality of vertical output lines. The output signals derived from the network BV are applied to switching elements of the common control system GS*t* and cooperate in effecting switching within the code switching and conversion system Z1 for converting the short identification code to a conventional identification code, in a manner explained hereafter. The outputs of the unit *ezh*, as schematically indicated, are also applied directly to the common control system GS*t* and, in response thereto, the common control system GS*t* controls the operation of a pathfinder WS for connecting the thus identified calling subscriber station N1 to an appropriate, available link, such as HU. The connection of a calling subscriber station to a link or other suitable apparatus under the control of a common control system is well known in the art and therefore is not indicated or explained in detail herein. The connection is shown illustratively by the provision of multiple selectively controlled couplers EK, ZK, and MK, MAK, the latter associated with link and line circuits HU and AU, respectively, and all of which are schematically indicated as being selectively controlled by the pathfinder WS in response to appropriate control signals from the common control system GS*t*. The link HU is schematically indicated to be switchable into a circuit for operation as a local line circuit, and therefore is connected at its output through a coupler MG, also controlled by the pathfinder WS, to the coupler ZK for completion of connections to an extension station of the telephone installation. By contrast, the live circuit AU is representative of a connection for completion of connections to remote subscriber stations and is connected to an external line AL. The connections of the line circuits, of course, are determined by the call connection demanded by a dial information code from a calling subscriber station, in accordance with the operation of the central control system of the installation.

Simultaneously with the completion of the connection of the calling station N1 to the link HU, coupler SK is operative to close its coupling element *sk*1 to connect a free digit store W*h*1 to the seized or engaged link HU. Upon the subsequent dialing of a dial information code at the station N1, the code is thereby received in the seized link HU and transmitted to the digit store W*h*1 for subsequent processing. The processing includes evaluation of the digit code by the dial evaluator WB. The switching processes required for establishing the connections as indicated above, and the evaluation and control functions of the digit evaluator WB and the common control system GS*t* are described in detail in German Pat. No. 1,196,251 and corresponding British Pat. No. 1,022,022, and are not therefore described in detail herein.

For purposes of explanation of operation of the system of the invention, it shall be assumed that the subscriber at station N1 dials a short identification code of one digit position, for example the identification digit 2, to demand a call connection to a given extension station. The identification digit 2 is identified in code fashion in digit store W*h*1, over receiving system E1. The receiving system E1 applies the received identification digit or digits to appropriate ones of a plurality of relays WH1 . . . WE0. For the present example, relays WH1 and WH3 are energized by system E1 in response to receipt of the identification digit 2. This results in closure of their corresponding contacts *wh*1 and *wh*3 and the production of signals indicative of the received digit code information, for application to digit code evaluator WB.

The digit evaluator WB includes a plurality of relays, indicated schematically by the relays DH1 . . . DE1 and a plurality of special relays GH . . . GE, ZE, ZW, ZN, for responding to the digit information codes received from the calling subscriber. The digit evaluator WB responds to only a single digit store, such as W*h*1, at a given time.

Upon the receipt of each dial identification digit, the responding digit store, such as W*h*1, requests the digit evaluator WB to determine whether the thus received dial identification digit represents a complete identification code and, in addition, what switching process is to be initiated when the completed dial identification code is received. In making this request, the digit store also transmits additional information to the digit evaluator; this information includes an indication of the type of line circuit which is currently connected with the digit store and the condition of this connected line circuit.

In the present example of operation, the line circuit HU which is engaged in a connection with digit store W*h*1 may be a local line circuit or link. If a completed connection to a called speaking station has not yet been completed, this condition of the link is represented by energization of a relay ZE in the digit evaluator WB. The relay ZE of digit evaluator WB is energized through a circuit including contacts 6*n*1 and *k*1. The contact *k*1 is normally closed; the contact 6*n*1 is normally open but is closed in response to actuation of a response relay which, although not shown, is included in the digit store W*h*1 and is identified for convenience as response relay N1, to correspond to the contact 6*n*1. The response relay N1 indicates the successful connection of the store W*h*1 to the digit evaluator WB, in response to a request for this connection. The connection may be established by a digit store finder, not shown in the drawings; a digit store finder is a well-known form of apparatus which satisfies a connection request in accordance with priority and availability conditions, and typically is controlled in its operation by a common control system, such as GS*t*. The contact 5*n*1 is also operated by the response relay N1 and is connected in circuit in a normally open position to prevent the transmission of information relating to the received dial code from the store W*h*1 to the digit evaluator WB. Since contact 5*n*1 is closed only when the response relay N1 is energized, it is apparent that through the provision of a similar response relay in each of the digit stores of the installation, only the digit store currently connected with the digit evaluator WB is enabled to transmit to the latter information relating to the received digit information code.

The operation of digit evaluator WB and the construction thereof will be explained in the context of the current example of operation in response to a short dial identification code comprising a single dial digit 2. As noted previously, contacts *wh*1 and *wh*3 were closed in response thereto, producing short identification code representative signals at their output terminals. Relays DH1 and DH3 are thereby energized for the identification digit 2; the energization thereof effects closure of the corresponding contacts 7*dh*1 and 8*dh*3 of the bank of relay contacts *dh*2 . . . *dh*4 and *dh*1 . . . *dh*5, respectively. The relay ZE, which now is energized since a call connection has not been completed, effects closure of its contact *ze*1. As a result, relay winding K1 is energized through a circuit including the positive power supply terminal connected to the fixed terminal of contact *ze*1, rectifier G7, the now closed contacts 8*dh*3 and 7*dh*1, and the negative power supply terminal connected to the fixed terminal of the contact 7*dh*1. Energization of relay winding K1 effects closure of its corresponding contacts 10*k*1, 14*k*1, and 23*k*1 in the digit evaluator WB.

Closure of contact 10*k*1 produces a request to the common control system GS*t*, by completing a circuit from a positive power supply terminal connected to the fixed terminal thereof through a rectifier to a first terminal of the relay winding WE. The winding WE is energized when a circuit is completed from its other terminal thereof through the normally closed contact 12*we* and the normally open contact 11*c*, and from the fixed terminal of contact 11*c* to the negative power supply terminal. Contact 11*c* is associated with a control element of the common control system GS*t* and gradually returns to the closed position indicated, following the release of the common control system GS*t* from a prior call connection processing function. Energization of winding WE will effect opening of its associated contact 12*we*, thereby opening the energizing circuit; however, if a dial termination indication is produced which indicates that a complete dial code has been received, and when the request based on this termination information satisfies a priority response order of the common control system GS*t*, then a holding circuit is established for the relay WE in a manner not shown in the drawings but well known to those skilled in the art.

Thus, when a proper short identification code has been received, and when the request from the digit evaluator WB corresponding to that code is received, the relay winding WE will be energized in the common control system GS*t* and the latter will initiate processing in accordance with the request. The energization of relay WE effects closure of its corresponding contact 13*we*, whereby relay windings KK and KK1 are energized in a circuit completed through the already closed contact 14*k*1 in the evaluator WB. Contact 14*k*1 was closed upon energization of the winding K1 of the dial evaluator WB in response to the receipt of the complete short dial identification code represented by the identification digit 2. Energization of winding KK1 effects closure of its corresponding contact 15*kk*1 which thereby produces a holding circuit for the relays KK and KK1 comprising the now closed contact 13*we*, the relays KK and KK1, the now closed contact 15*kk*1, and the normally closed contact 16*tr*. Energization of relay KK also effects transmission of a signal to the link HU engaged with the digit store W*h*1, in the current example; this is effected through closure of the corresponding contact 17*kk* which thereby completes a signalling circuit. The completed signalling circuit includes the normally closed contact 18*b*, the contact 23*k*1, the contact 19*n*1, closed due to energization of the response relay N1 (not shown) in digit store W*h*1 as described previously, and applies a signal to the link selector SU. Link selector SU thereupon transmits a signal to the relay I of the link HU.

Due to energization of relay I, link HU may respond by switching the *c*-conductor, indicated in FIG. 1 as connected through the various couplers to the link HU and to the signalling set T1, from a normally high to a low resistance value. The result of switching of the *c*-conductor is to enable the energization of certain response relays in the second identification system I*d*2.

The second identification system I*d*2 includes a plurality of relays corresponding to the decimal positions of the identification code relating to the calling subscriber station, in a manner substantially similar to that of the first identification system I*d*1. In a manner substantially identical to the operation of the first identification system I*d*1, the relays of the identification system I*d*2 which correspond to the identification code of the calling subscriber station are energized at this time. For this purpose, and in accordance with the given example of the identification code 110 for the calling subscriber station N1, there are shown only the corresponding relays IH1, IZ1, and IE0 which respond to the code 110 and are energized thereby. The energization of these identification relays effects closure of their corresponding contacts 20*ih*1, 21*iz*1, and 22*ie*0, thereby producing identification signals which are transmitted to the code switching and conversion system Z1 and, particularly, to selected horizontal lines thereof which are connected to the corresponding vertical lines through which the identification signal relays H1, Z1, and E0 of the marker M are energized.

The energization of the signal relays corresponding to the identification of the calling subscriber, however, results only in the production of a group characteristic identification signal, through the operation of the control system GS*t* in response to the output of the network BV. The group characteristic identification may comprise identification of a single speaking station or of a group of speaking stations. It shall be assumed that the identification of the code 110 of the calling subscriber station N1 in marker M produces, over the network BV, an output signal at a terminal of the latter which completes an energizing circuit for the relay winding I of group characteristic code relay B2. In the drawing, this circuit is indicated by the output line labeled 110 of the contact unit *ezh*, which line 110 is connected through a diode in series with the winding I of relay B2 and the relay winding T*r* to a negative power supply terminal. Group characteristic identification relay B2 remains energized over a holding circuit established by closure of its corresponding contact 24*b*2 upon energization of winding I thereof, and due to the prior closure of contact *kk* in response to energization of winding KK. Energization of winding relay T*r* effects opening of its contact 25*tr* which thereby opens the holding circuit for the identification signal relays of the marker M. As a result, the marker M is free, or released from the calling subscriber identification function and is in condition for identification of the called subscriber station. The energizing circuit for winding I of relay B2 and for relay T*r* is thereby opened, winding II of relay B2 remains energized. Contact 25*tr* thereupon closes, whereby marker M is in condition for response to the identification code of the called subscriber station.

The short identification code, namely the identification digit 2 in the current example, must be converted to a conventional code to which marker M responds for establishing a call connection to the called subscriber station. The common control system GS*t* transmits an output signal to the code switching and conversion system Z1 in accordance with the now closed contacts 27*kk*1 and 26*b*2. Contact 27*kk*1 is closed as a result of the prior energization of the winding KK1 in response to receipt of the short identification digit 2; contact 26*b*2 is closed as a result of the prior energization of relay B2 which identifies the group to which the calling subscriber station N1 belongs. The common control system GS*t* thereby applies a positive potential from the fixed terminal of contact 26*b*2 to the vertical line of system Z1 which is associated with the output terminal of the contact 27*kk*1. The rectifiers G1, G2, and G3 associated with this vertical line apply the positive potential to respectively associated horizontal lines of the system Z1 to which they are connected. These horizontal lines are further connected to the vertical lines associated with the identification signal relays E1, Z2, and H2, respectively, of marker M.

Thus, the short identification code 2 taken in combination with the group identification code of the calling subscriber station N1, is converted to an identification code 221 corresponding to the called subscriber station.

Energization of the relays H2, Z2, and E1 of the marker M effects closure of their corresponding contacts in the unit *ezh*. The marker M thereby is operative to perform its marking function and, under the control of the common control system GS*t*, and in accordance with the functioning of pathfinder WS and the information provided by the link finder SU and identifying the engaged link HU, the call connection circuit is completed. The completing of the call connection between link HU and the called subscriber station is well known in the art and therefore is not shown in detail. Further, in a well-known but not indicated manner, upon completion of the call connection, the common control system GS*t* is released from association with the given call connection. Further, the digit evaluator WB and the engaged digit store W*h*1 are released; in fact, these systems may be released immediately following the reidentification of the calling subscriber station and the derivation of the corresponding group characteristic identification, simultaneously with the energization of relay T*r* in the common control system GS*t*.

In summary, and in accordance with the foregoing detailed description, the identification of the subscriber station to be called, when demanded in accordance with a short identification code which may comprise only a single identification digit, is effected in accordance with the group characteristic identification of the calling subscriber station and in accordance with the particular dialed short characteristic code or digit. For a given group identification digit or code relating to one or a plurality of calling subscriber stations, different short identification codes may be dialed and will result in marketing for completing connection paths to a corresponding number of different called subscriber stations. By contrast, a given short identification code dialed by different subscriber stations having different group characteristic identification codes will result in marking and completion of call connections to corresponding, different called subscriber stations.

The installation of the invention may readily be modified, such as to satisfy different, desired conditions within the installation. For example, if it is desired, for a given short identification code, to demand a connection to a different called subscriber station than that currently established, the only circuit modification required would be to change a digit code responsive element of the digit evaluator WB or in the alternative, to change the wiring connections within the network BV or in the code switching and conversion system Z1. These changes, discussed in detail hereafter, may readily be accomplished by providing removable rectifier interconnecting links in these networks in a plug board type fashion.

As noted previously, a plurality of subscriber stations having different group characteristic identification codes may be associated with the installation of the invention. Assume that a subscriber at a station other than the indicated station N1 dials the identical short identification code, namely the digit 2, as in the foregoing discussion of the operation of the installation. The relay K1 of the digit evaluator WB is again actuated, closing its contact 10*k*1 and producing a request to the common control system GS*t*. When the common control system GS*t* responds to the request, relays KK*t* and KK1 are actuated and initiate the reidentification of the calling subscriber station.

The calling subscriber station for this example will be assumed to be identified by the code 131, the signal relays of marker M responding to the identification signals transmitted through the switching and conversion system Z1 from a responding identification system such as I*d*1 to produce on the output line of the contact unit *ezh* a signal indicative of the calling subscriber having the code 131. In the drawing there is indicated an output line labelled 131 to represent this output signal. The output signal is applied to the network BV and particularly through diode G8 thereof to effect energization of relay B1, through winding I thereof, and of the relay T*r*. Similarly to the relay B2, group identification code relay B1 is energized in a holding circuit through its second winding II due to closure of its contact *b*1. Relay B1 also effects closure of its contact 29*b*1 in an energizing circuit with the now closed contact 28*kk*1 to apply a positive conversion signal to the associated vertical line of the switching and conversion system Z1. This conversion signal is applied through diodes G4, G5, and G6, connected to this vertical line, to associated horizontal lines of the system Z1. The conversion signal is applied from the horizontal lines to the vertical lines connected thereto, and associated with the identification signal relays H1, Z2, and E0, corresponding to an identification code 120 of the called subscriber station. As in the previous example, therefore, a conversion signal applied to an input terminal of conversion system Z1 results in outputs at an associated group of output terminals thereof representing a plural digit individual identification code of a called station.

Thus, these two examples of operation clearly demonstrate that the same short identification code, namely the single identification digit 2, when dialed by calling subscribers at subscriber stations having different group characteristic identification codes, will result in completion of call connections to different, called subscriber stations each identified by respectively associated, different identification codes. It will also be apparent that the two calling subscribers of the foregoing example may be representative of two groups, each group containing a plurality of calling subscriber stations and having the same identification code for all subscriber stations of the group.

As discussed previously, the installation of the invention may readily be modified to change the speaking station to be reached for a given short identification code, such as the digit 2. In the foregoing example of operation relating to calling subscriber station 131, it may be desired that the called speaking station to which a connection is completed in response to the identification digit 2 be that identified by an identification code 221 instead of the station identified by code 120. This change may be effected by breaking the shown connection of rectifier G8 to the vertical line associated with relay B1 in the network BV and completing a connection to the vertical line of network BV associated with the relay B2. The network BV may be made readily accessible to permit these changes in connections. In accordance with this modification of the second example of operation relating to calling station 131, it will be apparent that calling subscriber stations of initially different codes may be readily modified to demand a connection to the same called subscriber station in response to the same short identification code.

Other modifications are also readily achieved. For example, the called speaking station which will be reached as a result of a given short identification code, such as the digit 2, in response to the dialing of that digit by one or more calling subscriber stations of a given group characteristic identification may also readily be changed. For the digit 2, the group characteristic is identified in system GS*t* by the relay B2. In the foregoing examples, calling station N1 having code 110 is thus identified as to its group by the diode connection in network BV; similarly, in the modified example relating to calling station 131, connection of diode G8 to the relay B2 also identifies station 131 with this same group. By the simple expedient of changing the shown connections of diodes G1, G2, and G3 associated with the vertical line of system Z1 which is controlled by the relay B2, to different horizontal lines of the system Z1, the resultant conversion of the identification code will produce a conventional identification code identifying a different called subscriber. The signal relays of the marker M will thereby be energized in accordance with this different identification code resulting from conversion of the short identification digit, whereby marking and call connection operations proceed in accordance with this different code to complete a connection to the thus newly identified called subscriber.

As also described previously, it may be desired to change the identification digit to be dialed by a given calling subscriber station for completing a connection to a given called subscriber station. With regard to the foregoing examples, this change corresponds to changing the digit 2 to some other digit. To effect this change, it is only necessary to change the connections of diode G7 in the diode switching network of digit evaluator WB whereby the vertical line of relay K1 is connected to the appropriate horizontal line switched into circuit by closure of the corresponding ones of the banks of contacts associated with this network.

In the foregoing examples, the short identification code has comprised a single identification digit. The installation of the invention, however, permits the use of short identification codes of any desired number of digits. As an example of this operation, assume that the short identification code comprises two digits and, particularly, the identification digits 12. In response to the digits 12, the relay K2 of digit evaluator WB is energized rather than the relay K1. Its corresponding contact 1*k*2 is thereby closed to produce a request to the common control system GS*t*. Its corresponding contact 2*k*2 is also closed and, due to the aforedescribed closure of contact 13*we* the relays KK and KK2 are energized; by contrast, the relay KK1 is not energized. Assuming that calling subscriber station 110 has dialed the short identification code 12, the group characteristic identification relay B2 is energized in the common control system GS*t* through the network BV. The circuit is again completed over contact **26*b*2 which is closed due to energization of relay B2 but, by contrast to the foregoing example, since relay KK1 is not energized, its corresponding contact 27*kk*1 remains open. In this instance, however, contact 30*kk*2 of the now energized relay KK2 is closed and applies a group identification signal to the conversion system Z1, and particularly to the vertical line associated with contact 30*kk*2; diodes G9, G10, and G11 are connected to this vertical line and apply the signal to their associated horizontal lines. The signal applied to these vertical lines associated with diodes G9, G10, and G11 energizes the identification signal relays H2, Z2, and E0 of marker M. The short identification code 12 thereby is converted to the code 220** which is therefore the code of the called subscriber station and is applied to marker M. It will be appreciated that short identification codes of any desired number of digits as required for the capacity of a given installation may be employed, and that the identification codes of the calling and called subscriber stations and groups thereof may similarly be selected to satisfy the required capacity of the system.

The renewed identification of the calling subscriber station in the foregoing description was effected in system I*d*2 through changing the resistance value or potential level of the *c*-conductor. This renewed identification, however, may be effected in various alternative manners. For example, it may be accomplished through control of the relays, such as the calling or subscriber relays associated with the speaking path of the subscriber circuit. In this alternative embodiment, only a single identification system I*d*1 is required and the system I*d*2 may be eliminated.

The logic or conversion connections of the switching and conversion system Z1 may be demanded by alternative switching operations in the common control system GS*t*, thereby providing increased utilization and versatility in the response capabilities of the installation of the invention. For example, in the foregoing discussions of operation, the vertical line of the system Z1 associated with diodes G1, G2, and G3 was actuated by closure of contacts **26*b*2 and 27*kk*1**. However, there is also shown a contact labelled *km, sa* which, if closed, would also be effective to apply an energizing potential to this same vertical line. Contact *km* could be actuated in response to dialing by a calling subscriber station of a predetermined announcement identification digit. In the alternative, the contact *sa* could be actuated in response to the dialing of a special connection number. The alternative labelling of this contact as *km* and/or *sa* is to indicate these alternative response capabilities of the contact, such as may be provided by controlling this contact in response to either or both of a pair of independently operable switching relays. These special connection capabilities may, of course, be provided for certain ones or all of the vertical lines of the switching and conversion system Z1 which are controlled by the common control system GS*t*.

In summary, the telephone installation of the invention provides for conversion of short identification codes of any desired number of digits for completing a call connection to a desired called subscriber in accordance with a group characteristic identification code of the calling subscriber station. The conversion function is performed with a minimum number of circuit ssytems and thus is of reduced complexity and cost, relatively to conversion systems provided for this purpose in the prior art. The installation of the invention is highly versatile in operation, permitting the use of special connection numbers or announcement indications for completing predetermined call connections from a given called subscriber station, in addition to the code conversion operations. Further, the installation may readily be modified to change the destination, or called subscriber station, demanded by a given short identification code or for changing the short identification code to be employed by a given calling subscriber for demanding a connection to a given called subscriber. The conversion is effected in accordance with a group characteristic identification of the calling subscribers and this group identification may also be readily changed for the calling subscribers associated with the installation. These various changes may be effected through the simple expedient of providing plug board networks which relate the group and individual identification codes of the calling and called subscribers.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptations as fall within the true spirit and scope of the invention.

What is claimed is:

1. A centrally controlled telephone installation having subscriber stations identified by individual plural digit codes and by group characteristic identification codes wherein a calling subscriber station may demand a connection to a called subscriber station by emitting a short identification code of fewer digits than the individual code of that station, the installation providing for converting a received short identification code to the individual identification code of the called subscriber station and responding to the latter to complete the demanded call connection, comprising:

evaluation means (WB) for detecting the digits of identification codes received from calling subscriber stations and for determining when a received identification code is complete, said evaluation means (WB) including control means (K1, K2) producing respective control outputs corresponding to the digit values of evaluated short identification codes.

individual identification means (I*d*2) responsive to an output of said evaluation means (WB) representing receipt of a complete short identification code to produce the individual identification code (110) of the corresponding calling subscriber station (N1), group characteristic identification means (B2–**26*b*2**) responsive to the individual identification code produced by said individual identification means (I*d*2) for indicating the group characteristic identification code of the calling subscriber station (N1), and conversion means (Z1) responsive to an evaluated short identification code control output produced by said evaluation means (WB) and to the group characteristic identification code indication of the corresponding calling subscriber station (N1) produced by said group characteristic identification means (B2–**26*b*2) to establish the individual identification code (221**) of the called subscriber station.

2. A telephone installation as recited in claim 1 wherein there is further provided:

marking means (M) responsive to the individual identification code (221) established by said conversion means (Z1) of a called subscriber station to perform a marking function for completing a call connection between said calling (N1–110) and called (221) subscriber stations.

3. A telephone installation as recited in claim 2 wherein said marking means (M) is responsive to complete individual identification codes of called subscriber stations both when received directly from a calling subscriber station and when established by said conversion means (Z1), to perform marking functions for completing call connections to the thus identified called subscriber stations.

4. A telephone installation as recited in claim 1 wherein there is further provided:

a common control system (GS*t*) including request response means (WE, **13*we***), short identification code indication means (KK1–27*kk*1), and said group characteristic identification means (B2–26*b*2), said evaluation means (WB), upon determining receipt of a complete short identification code, requesting said common control system (GS*t*) to identify the subscriber station to be called, said request response means (WE) of said common control system (GS*t*) rendering said identification means (I*d*2) operative to determine the individual identification code (110) of the corresponding calling subscriber station (N1), and said short identification code indication means (KK1, 27*kk*1; KK2, 30*kk*2) being operative in response to the control output (14*k*1, 2*k*1) of said control means (K1, K2) of said evaluation means (WB) to produce a short identification code indication to which said conversion means (Z1) responds.

5. A telephone installation as recited in claim 4 wherein said common control system (GS*t*) further includes switching means (KK, 17*kk*) operated in common with said short identification code indication means (KK1, 27*kk*1; KK2, 30*kk*2) thereof in response to the control output of said evaluation means (WB) to effect the identification of the corresponding calling subscriber station (N1–110).

6. A telephone installation as recited in claim 4 wherein:

each of said short identification code indication means (KK1, 27*kk*1; KK2, 30*kk*2), group characteristic identification means (B2), and request response means (WE) comprises a relay having corresponding contacts (27*kk*1, 30*kk*2; 26*b*2; 13*we*), and selectively associated ones of said contacts (27*kk*1, 30*kk*2; and 26*b*2) are connected in a plurality of selective signalling circuits for actuation in response to energization of said corresponding short identification code indication relay (KK1; KK2) and said group characteristic identification relay (B2), respectively, to produce a conversion signal representative of a specific group characteristic identification indication and a specific short identification code indication to which said conversion means (Z1) responds.

7. A telephone installation as recited in claim 6 wherein said conversion means (Z1) comprises a selective connection network including:

a first plurality of input terminals, the conversion signals produced by said common control system (GS*t*) being applied to respectively associated input terminals, and a plurality of output terminals connected in selective groups thereof to respectively associated input terminals, each group of output terminals producing an individual identification code output of a plurality of digit positions and identifying the called subscriber (221) in response to the application of a conversion signal to the respectively associated input terminal.

8. A telephone installation as recited in claim 7 wherein there is further provided:

identification means (I*d*1) for identifying the individual identification code of a calling subscriber station (N1) upon initiation of the call, in an individual identification code output of a plurality of digit positions, and a second plurality of input terminals associated with said conversion system (Z1) and directly connected with respectively associated output terminals thereof for producing at said output terminals the individual identification code (110) of a calling subscriber station determined by said identification means (I*d*1) upon initiation of a call.

9. A telephone installation as recited in claim 8 wherein there is further provided:

marking means (M) responsive to the individual identification codes of calling and called subscriber stations to perform a marking function for completing a call connection therebetween, said marking means (M) including a plurality of relays (E1, E0; Z1, Z2 . . . ; H1 . . . H0) connected to corresponding output terminals of said conversion means (Z1) and selectively energized in response to individual code identification output signals at said output terminals to maintain the presentation of the individual identification codes for the duration of marking.

References Cited

UNITED STATES PATENTS 3,194,890 7/1965 Haskins.

FOREIGN PATENTS 1,215,773 4/1964 Germany.

KATHLEEN H. CLAFFY, Primary Examiner

T. W. BROWN, Assistant Examiner

U.S. Cl. X.R.

179—18